Jan. 7, 1964 W. G. BIRD 3,116,639
APPARATUS FOR THE MEASUREMENT AND INTEGRATION
OF FLUID-VELOCITIES
Filed March 28, 1960 6 Sheets-Sheet 2

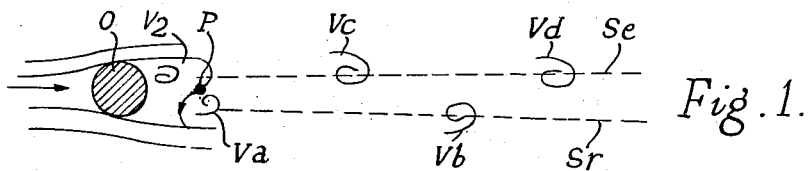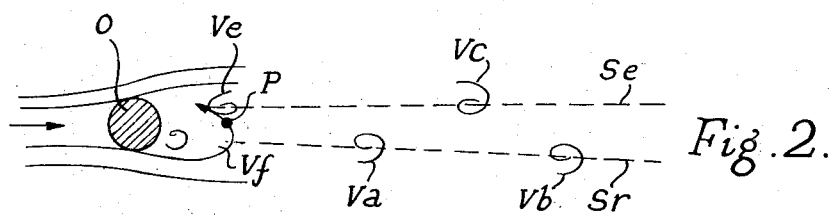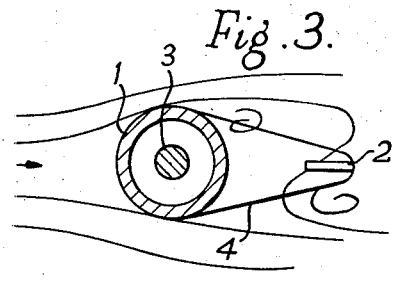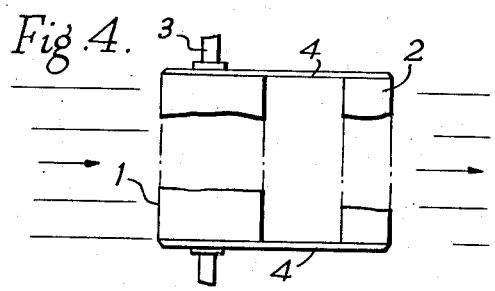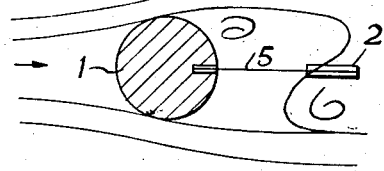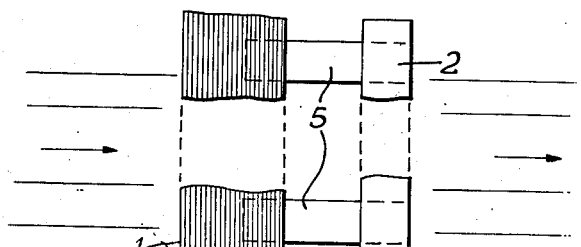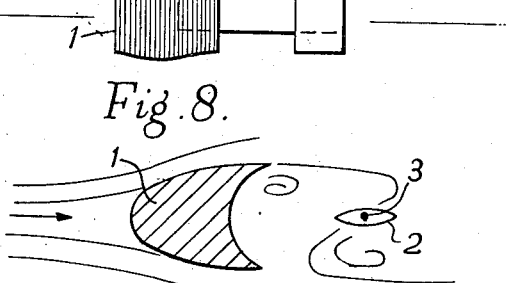

INVENTOR
WILLIAM G. BIRD
BY Wenderoth, Lind & Ponack
ATTORNEYS

Jan. 7, 1964 W. G. BIRD 3,116,639
APPARATUS FOR THE MEASUREMENT AND INTEGRATION
OF FLUID-VELOCITIES
Filed March 28, 1960 6 Sheets-Sheet 3

INVENTOR
WILLIAM G. BIRD
By Wenderoth, Lind & Ponack
ATTORNEYS

Jan. 7, 1964  W. G. BIRD  3,116,639
APPARATUS FOR THE MEASUREMENT AND INTEGRATION
OF FLUID-VELOCITIES
Filed March 28, 1960  6 Sheets-Sheet 4

INVENTOR
WILLIAM G. BIRD
BY
Wenderoth, Lind & Ponack
ATTORNEYS

Jan. 7, 1964 W. G. BIRD 3,116,639
APPARATUS FOR THE MEASUREMENT AND INTEGRATION
OF FLUID-VELOCITIES
Filed March 28, 1960 6 Sheets-Sheet 6

INVENTOR
WILLIAM G. BIRD
BY
Wenderoth, Lind &
Ponack
ATTORNEYS

United States Patent Office 3,116,639
Patented Jan. 7, 1964

3,116,639
APPARATUS FOR THE MEASUREMENT AND INTEGRATION OF FLUID-VELOCITIES
William George Bird, Redland, Bristol, England, assignor to Savage & Parsons Limited, Watford, England
Filed Mar. 28, 1960, Ser. No. 18,102
19 Claims. (Cl. 73—194)

This invention concerns improvements in or relating to apparatus for the measurement and integration of fluid-velocities and more particularly relates to devices for the measurement of the relative velocity between a body and a contiguous fluid or of the total flow of the fluid past the body in a specified time. Such devices are applicable for use as anemometers, as ship's logs or leeway-indicators, and as air-speed indicators or air-distance indicators for aircraft, or alternatively as flow-meters to measure the velocity of flow of a fluid through a pipe or channel and/or to measure the total quantity of fluid passing a given point in the pipe or channel in a specified time, or for any other similar application.

There are three systems in general use at the present time for measuring the relative velocity between a body and a contiguous fluid. In one of these systems, an impeller or rotor is rotatably pivoted on the body, or on a part fixed relatively to the body, and is immersed in the fluid, said impeller or rotor having either, as for example is the case in a windmill, inclined blades radial to its axis of rotation with the latter arranged substantially along the direction of flow of the fluid relative to the body, or, as is the case in the well-known Robinson anemometer, cups or the like on arms radial to the axis of rotation with the latter arranged substantially at right angles to the direction of flow of the fluid relative to the body. Flow of the fluid relative to the body causes the impeller or rotor to rotate with an angular velocity dependent on the relative velocity between the body and the fluid and this rotation may operate, by electrical or mechanical means, an indicator which is suitably calibrated to indicate the said relative velocity.

Such arrangements using an impeller or rotor suffer in many applications from the disadvantage that the angular velocity of the impeller or rotor is not, as it is desirable that it should be, accurately proportional to the relative velocity between the fluid and the body and independent of the density of the fluid unless the impeller or rotor can rotate completely freely without frictional or other constraint, and such a completely free rotation is obviously very difficult to achieve and maintain in practice. Furthermore, the resistance to the flow of the fluid of the impeller or rotor with its mounting may be considerable, and in some applications, such as in high-speed aircraft for example, may be very objectionable for this reason.

In the second system, a so-called Pitot-static head is fixed on the body, or on a part fixed relatively thereto, and is immersed in the fluid, the difference between the dynamic and static fluid pressures at the Pitot-static head being used to operate an indicator which is calibrated to indicate the relative velocity between the fluid and the body. Alternatively, as is well-known, a Venturi tube or its equivalent may be utilised instead of a Pitot-static head and the difference of pressure between two points in the tube used for a similar purpose.

Apparatus which makes use of either a Pitot-static head or Venturi tube as above described suffers from the disadvantages in many applications that the difference of pressure tends to be proportional to the density of the fluid, and not independent thereof, whilst it also tends to vary as the square of the relative velocity between the fluid and the body, and not in proportion thereto. These are disadvantages which are particularly serious in the case of certain types of air-speed indicator or air-distance indicator for use in aircraft as the density of air depends to a marked degree on altitude and temperature, whilst the integration of air-velocities to indicate distance traversed through the air also presents obvious difficulties on account of the "square-law" relationship between pressure difference and relative velocity. The latter disadvantage similarly applies to the use of Pitot-static heads or Venturi tubes or their equivalent in flow-meters for measuring the total flow of a fluid through a pipe or channel in a specified time.

The third system in general use utilises the phenomenon of the cooling of an electrically-heated wire, and consequent decrease of electrical resistance thereof, by the flow past it of the fluid, but such cooling depends on many parameters besides the relative velocity between the said wire and fluid and is not, in general, even approximately proportional to the said relative velocity so that the measurement and integration of this relative velocity again presents great difficulties.

It is therefore an object of the present invention to provide an improved fluid-velocity measuring device which shall not suffer from the disadvantages of the devices above mentioned.

It is well known that vortices are formed when a fluid streams past an obstacle or through an orifice at a velocity greater than a certain critical value and less than another critical value, both values depending upon the dimensions of the said obstacle or orifice and upon the kinematic viscosity of the fluid. If the obstacle be, for example, a cylinder of circular cross-section the longitudinal axis of which is at right angles to the direction of the flow of the fluid, it is well known that, above a certain velocity of the fluid, vortices tend to be formed on the downstream side of the cylinder at regular intervals and alternately, firstly behind one side or edge of the cylinder and then behind the opposite side or edge, which vortices detach themselves from the cylinder in two nearly-parallel rows and are carried downstream at a velocity substantially proportional to, but somewhat less than, the relative velocity of the fluid. That is to say, the vortices have a slip-velocity which tends to bear a constant ratio to the velocity of the fluid. It is also well known that in each row the vortices are formed at a distance apart which tends to bear a constant ratio to the diameter of the cylinder but to be substantially independent of the relative velocity of the fluid. From these considerations it has been shown that the frequency at which vortices are formed behind either side or edge of the cylinder tends to be proportional to the relative velocity of the fluid and inversely proportional to the diameter of the cylinder, but to depend substantially upon no other factor or parameter, provided that the Reynolds number for the cylinder lies between certain limits. The Reynolds number is defined as the non-dimensional product of the relative velocity of the fluid and the diameter of the cylinder divided by the kinematic viscosity of the fluid.

The phenomenon of alternate vortex-formation in two rows in this way has been described with reference to an obstacle in the form of a cylinder of circular cross-section, but similar considerations apply in varying degrees to any obstacle of cylindrical form with its longitudinal axis at right angles to the direction of flow of the fluid, even if its cross-section is not of circular shape, provided of course that the said cross-section is not deliberately made of a shape which is streamline in the aerodynamic sense of the word. In all cases the result of the alternate vortex formation in two rows is to generate alternating forces on the obstacle which under suitable conditions will set it in oscillation in a plane perpendicular to the direction of flow of the fluid and may also cause compressional waves of sound in the fluid.

The phenomenon of alternate vortex formation in two rows in this way occurs frequently in the natural world, and is known to be the cause of, for example, the "singing" of telegraph wires in a wind, the "sighing" and "roaring" of wind in trees, and the "whistling" of wind through tall grasses. It is also the principle underlying the action of the well-known "Aeolian harp" and is one of the reasons for the fluttering of a flag in a breeze.

In a somewhat similar manner, vortices tend to be formed at regular intervals and alternately behind the sides of a parallel-sided slip or orifice through which a blade-shaped sheet of fluid is caused to issue into a space containing the same fluid substantially at rest, and as before the frequency at which these vortices are formed alternately behind either edge of the slit tends to be proportional to the velocity of the issuing fluid and inversely proportional to the width of the slit, but to depend substantially upon no other factor of parameter provided again that the Reynolds number for the slit lies between certain limits. In practice, the vortices formed in this way tend to be weak and unstable in comparison with those formed at the sides of an obstacle and in certain applications of this phenomenon, for example in organ-pipes, a wedge of small angle is located behind the slit at a certain distance therefrom and parallel thereto in order to stimulate production of vortices at a desired frequency.

It has been proposed hitherto to utilise the phenomenon of alternate vortex formation in two rows behind an obstacle as hereinbefore described in an arrangement for measuring the relative velocity between a body and a contiguous fluid comprising a cylindrical member pivoted to the body about an axis perpendicular to the longitudinal axis of said cylindrical member and at one of the ends thereof, said axis of pivoting being parallel to the direction of flow of the fluid. Flow of fluid past such a member causes the formation, in the manner already explained, of two nearly-parallel rows of alternate and equally-spaced vortices, one row forming on each side of the member, and the breaking-away of these vortices alternately from opposite sides of the member imparts an alternating transverse force thereto. As a result, an alternating moment or couple is generated about the axis of pivoting of the member, the frequency of alternation of said moment or couple being substantially independent of the density and temperature of the fluid but proportional to its relative velocity. The cylindrical member is accordingly set into oscillation about the said axis of pivoting at the same frequency as that of the said moment or couple and this frequency is measured by suitable means and the relative velocity of the fluid thereby determined.

This proposed arrangement is, however, a disadvantageous one in that the vortices generated are only in contact with, and can exert substantial pressure on, said cylindrical member for a relatively short period during a cycle, so that the impulses given to the member by the alternating moments or couples are correspondingly small. With a typical cylinder, for example, the diameter of the vortices may be approximately of the same order of size as the radius of the cylinder whereas the distance between successive vortices in the same row may be of the order of eight times the said radius. At the same time, the moment of inertia of a cylindrical member oscillating about an axis perpendicular to its length and located at one of its ends is a maximum for any axis passing through the member so that the angle through which the said member is deflected by the impulses tends to be undesirably small. This disadvantage is made greater by the fact that on any body, such as a ship or aircraft, which is liable to be subjected to local vibration, the cylindrical member would have to be balanced by an equivalent mass positioned on the other side of the said axis from said member, thereby further increasing the moment of inertia of the member and decreasing the general sensitivity.

Furthermore, with the arrangement described, considerable errors in the ultimate indications may arise if the direction of the flow of fluid past the cylindrical member is not accurately parallel with the axis of pivoting about which the said member oscillates, and such parallelism is not easy to ensure in many applications. This disadvantage exists even if the whole arrangement be mounted on a turntable so as to permit rotation about the longitudinal axis of the cylinder in its mean position since it is not inherently self-aligning to the direction of flow of the fluid and extraneous means would have to be provided in order to effect such alignment, particularly if the device were utilised as an anemometer or the like.

It is a further object of this invention therefore to reduce or eliminate the above-mentioned disadvantages and to utilise the phenomenon of alternate vortex-formation in two rows behind an obstacle or orifice for the measurement and/or integration of fluid-velocities in a different and more efficient manner.

Other objects and advantages of the invention will become apparent during the course of the following description of some forms of apparatus in accordance with the invention with reference to the accompanying drawings, in which:

FIGURES 1 and 2 show the mode of formation of vortices behind an obstacle;

FIGURES 3 to 16 show by way of example alternative arrangements of an obstacle and an associated vane-like oscillating element;

Figure 9:
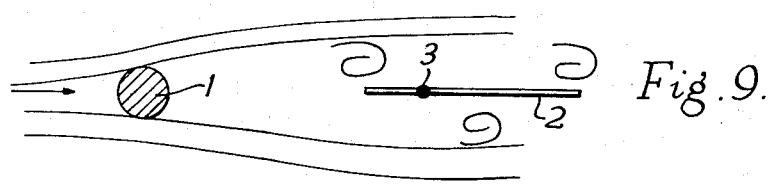

The improved device of this invention is arranged for measuring the relative velocity between a body and a contiguous fluid and comprises a vane-like element immersed in the fluid and mounted on the body, or on a part fixed relatively thereto, so that the plane of the element lies substantially parallel to the direction of flow of the fluid past the body and so that the element is capable of oscillatory motion about a longitudinal axis substantially at right angles to the direction of flow of the fluid. Means is provided for generating a double system of travelling vortices in the fluid in such a way as to cause them to impart an alternating moment or couple to the element about its axis of rotation and thereby to cause it to oscillate with a frequency substantially proportional to the relative velocity between the fluid and body.

The means for generating a double series of travelling vortices may comprise either an obstacle or an orifice arranged upstream of the vane-like element. In the case where an obstacle is used this may be combined with the vane-like element, which latter is then formed as a projection or tail on the obstacle, or the obstacle and element may be separate. In the case where an orifice is used this is conveniently formed in the upstream end of a casing which is immersed in the fluid and contains the vane-like element.

It is preferred to dimension the vane-like element in such manner that its length in the direction of fluid flow is such that a vortex on one side of the element is just passing beyond the downstream edge as the next vortex on the same side is beginning to overlap the upstream edge.

To comprehend more fully the principle of the invention, FIGURES 1 and 2 show diagrammatically in plansection a cylindrical obstacle O with a circular cross-section of diameter $b$ and with its axis at right angles to the direction of flow of a fluid, which fluid is supposed to be flowing with velocity $v$ relative to the obstacle. If, now, $\eta$ be the absolute viscosity of the fluid, $\rho$ its density, and $\nu$ ($=\eta/\rho$) its kinematic viscosity, then the so-called "Reynolds number" R for the obstacle is defined as the non-dimensional quantity $(vb/\nu)$.

Many experiments have shown that provided that the value of R for the obstacle lies between a lower and an upper limit (which for such a cylindrical obstacle of given diameter $b$ and a fluid of given kinematic viscosity is equivalent to stating that $v$ is between corresponding lower and upper limits) then consecutive vortices $V_a$, $V_b$, $V_c$ etc. are formed first behind one side of the obstacle and then behind the other, which vortices detach themselves periodically and move downstream with a velocity substantially equal to $(1-s)v$, where $s$ is a constant. That is to say, the detached vortices have a "slip velocity" $sv$ relative to the main stream which is substantially proportional to $v$.

FIGURES 1 and 2 represent the phenomenon in consecutive half-cycles. In FIGURE 1 the inward-spinning vortex $V_a$ has just detached itself from the right-hand side of the obstacle O, looking downstream, whilst an inward-spining vortex $V_e$ is forming behind the opposite left-hand side, and in FIGURE 2 this latter vortex $V_e$ has just detached itself from the left-hand side half a cycle later, whilst a new inward-spinning vortex $V_f$ is forming behind the opposite right-hand side.

The frequency $f$ with which the vortices detach themselves from one side of an obstacle of circular cross-section has been found to be given by the formula $f=\sigma(v/b)$, where $\sigma$ is an absolute or non-dimensional constant known as the "Strouhal constant" and approximately equal to 0.195, and provided that R is between the limits mentioned above, then $\sigma$ is the same for any fluid, whether liquid or gas, and is also substantially independent of the density, viscosity, and temperature of the fluid. For an obstacle of circular cross-section the lower limit for R is approximately 500.

Figure 10:
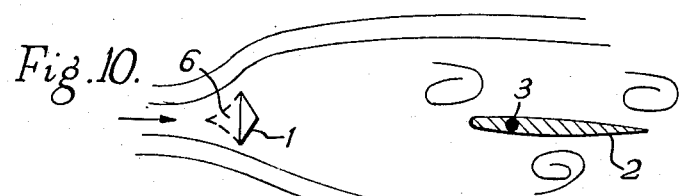

Similar considerations apply when the obstacle is not of circular cross-section and is, for example, a wide-angled prism with its base of breadth $b$ at right angles to the flow of the fluid such as depicted by 1 in FIGURE 10, or is in the form of a semi-elliptical rod of minor axis $\frac{1}{2}b$ with its rear part cut away so as to promote deliberately the formation of vortices in substantially the manner depicted by 1 in FIGURE 8. In such cases, the frequency at which the vortices are detached from one side is still proportional to $v$ and inversely proportional to $b$ but, depending upon the particular form of cross-section adopted, the corresponding "Strouhal constant" $\sigma$ may differ somewhat from that for an obstacle of circular cross-section although it is still substantially independent of the density, viscosity, and temperature of the fluid. Furthermore, the lower limit for R is not necessarily 500.

Experiments have also shown that for a variety of types of cylindrical obstacle with different cross-sections but the same overall breadth $b$ there is, as depicted in FIGURES 1 and 2, a point P on the centre line immediately behind the obstacle, and at a distance approximately equal to $b$ from the back of the obstacle, which is the mid-point of a zone extending for a distance of approximately $\frac{1}{4}b$ upstream and $\frac{1}{4}b$ downstream of P in which the resultant direction of flow of the fluid swings cyclically over a wide angle as depicted by the arrows at P.

After the vortices have detached themselves from the obstacle, they join the appropriate one of two rows or "streets" of vortices $S_l$ and $S_r$, and the distance $a$ between one vortex and the next in the same row tends to bear a constant ratio to the overall breadth $b$ of the obstacle whatever the velocity of the stream. The vortices of one row $S_l$ are staggered relatively to those of the other row $S_r$ by approximately one-half the distance between consecutive vortices in the same row, or $\frac{1}{2}a$, and the two rows extend down stream on slightly divergent paths until the vortices are dissipated by general turbulence.

The phenomenon of the periodic and alternate creation and detachment of vortices behind the two sides of a cylindrical obstacle immersed in a fluid, at a frequency proportional to the velocity of the fluid, has been shown to persist, at least in the case of an obstacle of circular cross-section immersed in air, up to an upper limiting velocity corresponding to a "Reynolds number" R of approximately 500,000. Taking into account the lower limit value, already mentioned, of R equal to 500 for such an obstacle, this signifies that the frequency of vortex generation is in this case substantially proportional to fluid-velocity alone over a range of speeds the ratio of the maximum to minimum of which is as much as 1,000 to 1. Similar considerations apply with cylindrical obstacles of other shapes of cross-section.

In many cases, however, the vortex "streets" down stream may be broken up by general turbulence before the above-mentioned upper limit of velocity is reached, although periodic and alternate creation and detachment of vortices adjacent to the point P depicted in FIGURES 1 and 2 still persists.

Upper limits to the velocity at which the phenomenon occurs are also set by two other factors. In the first place, the flow of fluid against an obstacle which is not perfectly streamlined results in a fall of pressure immediately behind the said obstacle which is proportional to the density of the fluid and to the square of its velocity. When the said velocity becomes so high as to make the fall of pressure substantially equal to the ambient pressure of the fluid, cavitation is created behind the obstacle and this inhibits the formation of vortices. In the second place, the formation of vortices is also inhibited when compressibility effects in the fluid becomes appreciable, that is to say when its velocity becomes comparable with the velocity of sound in the fluid. As a rule, it is obviously the first effect which is of prior importance in the case of liquids and the second effect in the case of gases.

The vortices generated behind a suitably-shaped obstacle in a stream of fluid, in the manner just described, may be used, in conjunction with an oscillating vane-like element of which the axis of oscillation is at right angles to the direction of flow of the fluid, to measure and integrate the fluid velocity, and FIGURES 3 to 16 represent by way of example various possible combinations of the aforesaid obstacle and vane-like element whereby this discovery may be applied in accordance with the present invention.

In the arrangement shown in FIGURES 3 and 4, which are a plan middle-section and side elevation respectively, the obstacle 1 is conveniently in the form of a rod or tube having a vane-like element 2 connected therewith by struts 4, the whole member being mounted for oscillatory motion about the longitudinal axis 3 of the rod or tube and arranged in the path of flow of the fluid with the vane 2 on the downstream side of the obstacle 1 and with the direction of the plane of the vane substantially parallel to the initial direction of flow of the fluid. The combined member may be either journalled or pivoted in bearings fixed in relation to the body the relative velocity of which to the contiguous fluid it is desired to measure, or, alternatively, may be mounted so as to permit oscillation about a shaft fixed in relation to the said body passing through a clearance hole in the rod or tube 1 coaxially with the longitudinal axis 3.

Preferably the length of the vane 2 in a direction parallel to the initial direction of flow of the stream is approximately equal to the radius of the rod or tube 1, and the centre-line of the said vane 2 at right angles to the initial direction of flow of the fluid is spaced from the back of the obstacle 1 by a distance approximately equal to the diameter of the obstacle 1. With such an arrangement the centre line of the vane 2 will then tend to coincide with the point "P" depicted in FIGURES 1 and 2 and the swinging of the resultant direction of flow of the fluid in the vicinity of this point, in the manner already described, imparts an alternating transverse moment or couple to the vane 2 about the longitudinal axis 3, which moment or couple will in turn tend to cause the combined member to oscillate at the same frequency as the frequency of generation of the vortices.

In an alternative arrangement depicted in FIGURES 5 and 6, which are a plan middle-section and side elevation respectively, the oscillating vane-like element 2 may be attached by means of thin flexible strips 5 to a fixed obstacle 1, which obstacle may be in the form of a circular tube or rod or have any convenient shape suitable for the generation of vortices in the manner already described.

Preferably in this arrangement the dimensions and location of the vane 2 relatve to the obstacle 1 should be similar to that already described in the case of the arrangement depicted in FIGURES 3 and 4, that is to say the length of the vane 2 parallel to the initial direction of flow of the stream should be approximately equal to half the breadth of the obstacle 1 and the centre line of the vane 2 in a direction at right angles to the flow of the stream should be behind the back of the obstacle at a distance approximately equal to the breadth of the obstacle. The action of the fluid in causing oscillation of the vane is then similar to that in the previous arrangement.

In the arrangements shown in FIGURES 3 to 6 the obstacle 1 and oscillating vane 2 are effectively joined together, but in the arrangements shown in FIGURES 7 to 16 the obstacle 1 and oscillating vane-like element 2 are effectively separated, the obstacle 1 being fixed and the vane-like element 2 oscillating about an axis 3 which is preferably although not necessarily external to the obstacle 1 and is at right angles to the initial direction of flow of the fluid.

Thus in the arrangement shown in FIGURE 7 the vane 2 is downstream of the cylindrical obstacle 1, which obstacle is of circular cross-section and the vane 2 can oscillate about an axis 3 on the median plane of the system and at right angles to the initial direction of flow of the stream. As in the previous arrangements the length of the vane 2 parallel to the initial direction of flow of the stream is preferably made equal to the radius of the obstacle 1 whilst the centre line of the vane 2 at right angles to the stream is preferably at a distance behind the back of the obstacle equal to its diameter.

The longitudinal axis 3 about which the vane 2 oscillates may be formed in whole or in part of a spindle which is mounted in suitable bearings, the said bearings being on the body the relative velocity of which to the contiguous fluid it is desired to measure, and whilst the said longitudinal axis 3 may be located if desired at any point relative to the vane 2 and to the obstacle 1 along the median plane it is preferably located along the centre line of the vane at right angles to the initial direction of flow of the stream as shown in FIGURE 7.

It will be appreciated that if the vane 2 is made of a light material such as aluminium in the case of a liquid, or such as a suitably-protected balsa wood in the case of a gas, and the longitudinal axis 3 is at or near the point "P" shown in FIGURES 1 and 2, then the vane 2 will tend to swing in synchronism with the cyclic swing of flow of the fluid and under suitable conditions large amplitudes of oscillation will result.

If desired the cylindrical obstacle 1 depicted in FIGURE 7 may take any other convenient shape in cross-section, particularly in cases where it is important that the resistance of the whole system to the flow of the liquid should be small even at high speeds, and when it is desired to measure such high speeds without involving deleterious effects from cavitation. In such cases the arrangement shown in FIGURE 8 may be used, and the obstacle 1 may conveniently take the form of the fore-part of a streamlined strut with the after-part cut away at maximum breadth and recessed as shown at the back so as deliberately to promote the formation of vortices behind the obstacle 1, despite which cutting-away both the resistance of the obstacle to the flow of the stream and the drop of pressure behind the obstacle are much less than in the case of an obstacle of circular or other cross-section.

A good approximation to the fore-part of such a streamline strut as described may be produced by forming the front part of the obstacle 1 in the shape in section of a semi-ellipse, the ratio of the major to the minor axes of which is 58 to 13, whilst the recess at the back may be in the shape in section of an arc of a circle of included angle 120°.

As in the arrangement depicted in FIGURE 7, the vane 2 is preferably located downstream of the obstacle 1 on the median plane such that its centre line at right angles to the initial direction of flow of the fluid is at a distance from the plane of maximum breadth of the obstacle 1 approximately equal to the said maximum breadth, whilst the length of the vane 2 parallel to the initial direction of the flow of the fluid is approximately equal to one-half of the said maximum breadth. Preferably also the longitudinal axis 3 about which the vane 2 oscillates is located along the centre line of the said vane at right angles to the direction of flow of the fluid.

If desired for convenience of manufacture and strengthening purposes the plane vane depicted in FIGURE 7 may be replaced, in either of the arrangements depicted in FIGURES 7 and 8, by a vane of other suitable cross-section such as diamond-shaped, or in the form of the thin ellipse depicted in FIGURE 8.

In certain cases it may be found that the measurement of fluid velocity over a chosen range may require that the size of the vane 2 as depicted in FIGURES 1 to 8 is undesirably small, and in such cases arrangements such as depicted in FIGURES 9 to 16 may be used. In all these arrangements the vane 2 is located further downstream of the obstacle 1 than is the case with the arrangements depicted in FIGURES 3 to 8, and is on the centre line between the rows or "streets" of vortices depicted by $S_l$ and $S_r$ in FIGURES 1 and 2. The vane 2 is capable of oscillating about a longitudinal axis 3 at right angles to the initial direction of flow of the stream, so that as the vortices proceed downstream each tends to exert rocking action on the vane 2 as it passes due to the unbalanced pressure differences engendered, and since the vortices in one "street" are staggered relatively to the vortices of the other by approximately one-half of the distance between consecutive vortices on the same side, the effect of such successive rocking actions from opposite sides is to create an alternating moment or couple on the vane 2 at the same frequency as that of the generation of vortices behind one side of the obstacle 1.

Preferably, although not necessarily, the length of the vane 2 in the case of these arrangements depicted in FIGURES 9 to 16 is such that a vortex in one "street" is just passing the downstream end of the vane 2 as the succeeding vortex in the same "street" is passing the upstream end, at which time there will be then a vortex in the other "street" passing the mid-length of the vane 2. It can be shown that such an arrangement results in the creation of an alternating moment or couple about the longitudinal axis 3 of the vane 2 which, when plotted graphically against time, has a wave form which is an approximation to a sine wave, so that the corresponding mode of oscillation of the vane 2 is nearly sinusoidal and is substantially without unwanted harmonics.

With all the arrangements depicted in FIGURES 9 to 16 it is also preferred that the upstream end of the vane 2 be located behind the back of the obstacle 1 at approximately the same distance as the length of the vane 2 itself, since experiments have shown that this distance appears to correspond with a point at which the "streets" $S_l$ and $S_r$, shown in FIGURES 1 and 2, are fully formed whilst the vortices $V_a$, $V_b$ etc., have not yet had time to be substantially dissipated by turbulence.

In FIGURE 9 the obstacle 1 is depicted as circular in cross-section and it is preferred that both the length of the vane 2 in a direction parallel to the initial direction of flow of the fluid, and the distance of its upstream end from the back of the obstacle 1, should be about four and a quarter times the breadth of the obstacle 1 in order to satisfy the conditions laid down in the two preceding paragraphs.

It may, however, in some cases be desirable to use an obstacle of cross-section better adapted to the formation of "streets" of vortices, and in this latter respect the cross-section which is most efficient is clearly that which is least streamline, that is to say a parallel-sided thin plate at right angles to the direction of flow of the fluid. The mode of fluid-flow around, and of vortex-formation behind, such an obstacle is well-known, and without departing substantially from the general principles involved, such a plate may in practice take various forms, one of which is depicted in FIGURE 10; here the plate-like obstacle 1 is, for strengthening purposes, in the form of a wide angled prism, the base of which faces upstream. For further mechanical strengthening without substantially reducing the efficiency of the obstacle as a means for creating strong vortices, the section of such a plate may be extended upstream if desired as far as the circular arcs 6 depicted by the dotted lines in FIGURE 10.

With all such arrangements of an obstacle in a form substantially equivalent to a parallel-sided thin plate the "Strouhal constant" is substantially equal to 0.150 and it is preferred that the length of the vane 2 in a direction parallel to the initial direction of flow of the fluid should be approximately five and a quarter times the breadth of the plate, whilst the upstream edge of the vane 2 should be at approximately this same distance from the back of the plate 1. These distances then correspond to the distance between two consecutive vortices in the same "street."

Figure 11:
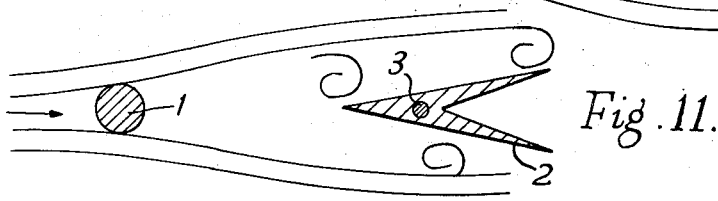
Figure 12:
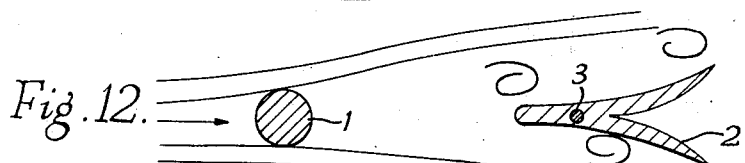

In both of the arrangements depicted in FIGURES 9 and 10, the vane 2 may for ease of construction and strengthening purposes be replaced by a vane of other cross-section such as the thin streamlined form depicted in FIGURE 10. Thus, in an alternative arrangement, as depicted in FIGURE 11, compensation for the fact that the "streets" of vortices diverge somewhat, and that each vortex is weakening as it passes downstream, may be made, and the vane 2 also strengthened mechanically, by constructing the said vane in the sectional form of a dart, having its back part cut away as depicted so as to improve its balance and reduce its moment of inertia about the axis 3. If necessary these desirable characteristics may be further enhanced by constructing the vane 2 with concave sides as depicted in FIGURE 12.

Figure 13:
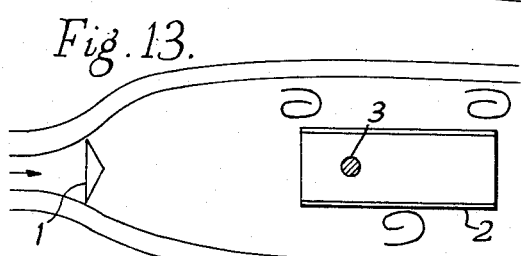
Figure 14:
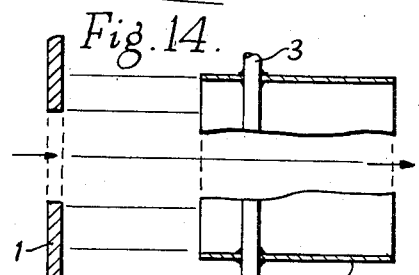

Alternatively the vane 2 may be constructed in the form of a section of a rectangular tube as depicted in horizontal middle-section in FIGURE 13 and vertical middle-section in FIGURE 14, so in effect bringing the operative sides of the vane 2, depicted in FIGURES 9 and 10, nearer to the "streets" of vortices; this may be especially important when the obstacle 1 is in the form of a parallel-sided thin plate or its equivalent and when the distance apart of the vortex "streets" is substantially greater than the width of the plate. The tubular construction of the vane 2 also results in a high degree of mechanical rigidity consistent with lightness which tends to the prevention of any unwanted flexural vibrations therein.

Figure 15:
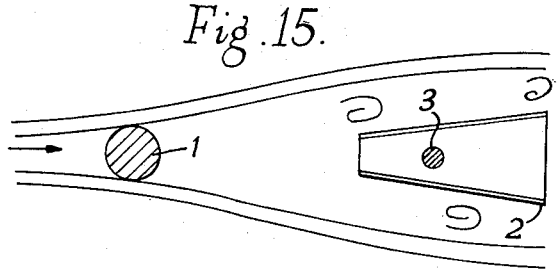
Figure 16:
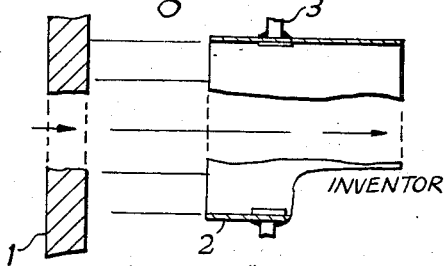

As a further alternative the vane 2 may be of tubular form as shown in FIGURES 13 and 14, but have its operative sides inclined inwards towards the obstacle 1 as depicted in horizontal middle-section by FIGURE 15 and vertical middle-section by FIGURE 16. As in the case of the arrangement shown in FIGURES 11 and 12, such a construction permits of some compensation for the divergence of the "streets" of vortices and for their diminution in strength as they travel downstream, but in addition it permits of the operative sides of the vane 2 being brought nearer to the vortex "streets" as in the case of the previous arrangement depicted in FIGURES 13 and 14. The structural rigidity of the vane 2 is also further enhanced over that of the corresponding vane 2 shown in FIGURES 13 and 14.

In the various arrangements of the invention depicted in FIGURES 3 to 16, it has hitherto been assumed that the obstacle 1 and vane 2 are immersed in a stream of fluid of such an extent that the relative velocity $v$ of the fluid at right anges to the axis of the obstacle is the same at all points along the length of this axis, or in other words that the flow of fluid past the obstacle 1 and vane 2 may be considered as substantially two-dimensional. In the case, however, when the obstacle 1 and vane 2 are mounted in a channel or pipe this assumption is valid only to a degree depending upon the shape in cross-section of the channel or pipe, and upon the proximity of its walls to the obstacle and vane.

From the fundamental formula $f=\sigma(v/b)$ it is apparent that if the velocity of the fluid does vary along the axis of a uniformly cylindrical obstacle then there is a tendency for component vortices to be created at different frequencies, and this tendency not only seriously reduces the strength of the resultant vortex formed first behind one side of the obstacle and then behind the other, but may also introduce an undesirable "beat" effect due to the superimposition of a number of component vortices having frequencies near to one another.

To obviate these effects it is preferred that, if practicable, any channel or pipe in which the obstacle and vane are located should be of substantially rectangular shape in cross-section with the lengths of the sides parallel to the axis of the obstacle substantially greater than the breadth of the channel or pipe at right angles thereto, so that the flow of fluid past the obstacle is, except near its two ends, substantially at uniform velocity. If desired also, the operative parts of the obstacle and vane may be confined in an obvious manner to that section of the channel or pipe at which the velocity may be considered as substantially uniform.

Figure 17:
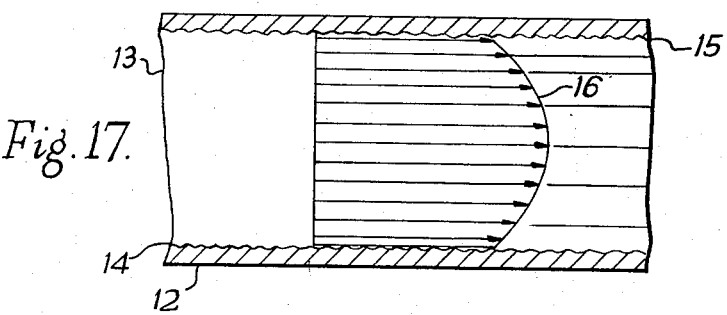
FIGURE 17 shows the distribution of velocities across a circular pipe down which fluid is flowing.
Figure 18:
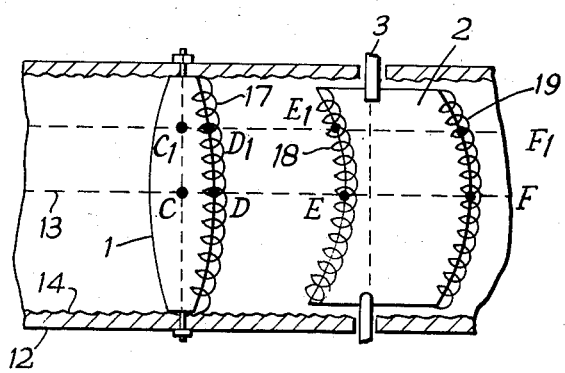
FIGURE 18 shows one means by which an obstacle and associated vane-like element may be constructed so as to compensate for the non-uniform distribution of fluid velocity in a circular pipe.

In cases, however, where it is impracticable to make the aforesaid channel or pipe of rectangular cross-section, and in particular where it is necessarily a pipe of circular cross-section, a correction for the non-uniform distribution of velocity across the section of such a circular pipe may, if desired, be effected by the means depicted in FIGURES 17 and 18. In FIGURE 17 the radially symmetrical distribution of the flow of fluid along a circular pipe 12 at various radial distances from the central axis 13 of the pipe is indicated diagrammatically by arrows, the length of an arrow at a given radial distance relatively to the length of the arrow along the central axis 13 having the same ratio as the relative velocities of the fluid at these two points. If now the inner surface 14 of the pipe be roughened by suitable "knurling" or otherwise, the velocity will be a maximum along the central axis 13 and will decrease radially outwards towards the inner surface 14 of the pipe until the so-called "boundary-layer" 15 is reached, across which latter the velocity drops sharply to zero at the actual inner roughened surface 14 of the pipe itself. The locus 16 of the tips of the arrows may be termed the "curve of velocities."

It is well known that if the flow of the fluid through such a roughened circular pipe 12 is turbulent, as it will be in virtually all cases in which the present invention is applied, then the "curve of velocities" from the central axis 13 of the pipe radially outwards follows an approximately "parabolic" law up to the "boundary-layer" 15, whilst the velocity at any radial point bears a substantially constant ratio to the velocity along the central axis 13 whatever this latter velocity may be. Such being the case correction for non-uniformity of flow may be effected by the means depicted in FIGURE 18.

The fundamental formula $f=\sigma(v/b)$ shows that if $v$ varies radially outwards along the length of the axis of the obstacle 1 in fixed proportions, then the frequency $f$ of generation of component vortices at all points can be made the same by varying $b$ in the same proportion. If, for example, the obstacle 1 be of circular cross-section and it is made "barrel-shaped" so that the diameter of cross-section $b$ at a radial distance from the central axis 13 bears the same ratio to the diameter of cross-section at the central axis 13 as do the relative velocities such as represented by the "curve of velocities" 16 in FIGURE 17, then the frequency of the component vortices generated at all points will be the same and will be proportional only to the velocity of the fluid along the central axis 13.

The same principle may obviously be applied with an obstacle of virtually any shape of cross-section if it be arranged that the maximum breadth $b$ at a given radial point bears the same ratio to the maximum breadth at the central axis 13 as do the relative velocities at these two points and all cross-sections are made geometrically similar. In particular, when a thin plate at right angles to the flow of the fluid is employed as an obstacle the width of the plate at any radial distance from the central axis 13 should bear the same ratio to its maximum breadth $b$ at right angles to this central axis 13 as do the relative velocities at these two points.

With such a "compensated" obstacle 1 as depicted in FIGURE 18, however, it is also preferred to shape the vane 2 correspondingly since the distance apart of the component vortices in their respective "streets" tends to decrease from the central axis 13 of the pipe outwards, this because, as has already been shown, the distance $a$ apart of vortices in their respective "streets" tends to bear a constant ratio, independent of velocity $v$ to the corresponding breadth $b$ of the obstacle, and this latter breadth $b$ now decreases as the sides of the tube in either direction off the central axis 13 is approached. The axes of the resultant vortices will therefore, instead of being straight, tend to "bow" increasingly as represented diagrammatically in FIGURE 18 by the spirals 17, 18 and 19, and with vanes 2 of the type depicted in FIGURES 9 to 16, this would signify that the rocking action of the various components of the "bowed" vortices would not be in phase and that the generation of vibration in the vane 2 would accordingly be inefficient.

The above-mentioned effect may, however, be substantially eliminated by "bowing" correspondingly both the upstream and downstream edges of a plane vane 2 as shown in FIGURE 18. Thus if the letters C, D, E and F denote the positions along the central axis 13 at which the latter axis is intersected respectively by the plane of the back edge or edges of the said obstacle 1, by the upstream edge of the vane 2, and by the downstream edge of the said vane 2, whilst the letters $C_1$, $D_1$, $E_1$, and $F_1$ represent the corresponding points for a line at a given radial distance from the central axis 13, then the upstream and downstream edges of the vane 2 should be preferably shaped so that $E_1F_1/C_1D_1$ always equals $EF/CD$ whilst in addition $D_1E_1$ must always equal $E_1F_1$. By such procedure the condition is obviously obeyed that the length of the vane 2 in a direction parallel to the initial direction of flow of the fluid and at a given distance from the axis 13 of the pipe, always bears the same ratio to the corresponding breadth of the obstacle 1 at the same radial distance (which ratio in the case of an obstacle of circular cross-section should be four and a quarter as already indicated) whilst at a given radial distance the upstream edge of the vane 2 is always at a distance behind the back of obstacle 1 which is equal to the length of that radial distance of the vane 2 in a direction parallel to the initial direction of flow of the fluid.

It is well known that if a blade-shaped sheet of fluid passes through a narrow parallel-sided orifice or slit into a chamber containing the same fluid substantially at rest, then at the point of issue from the orifice cylindrical vortices parallel to the sides of the orifice or slit tend to be formed alternately, first behind one edge and then behind the other, in a somewhat similar fashion to the formation of vortices around a cylindrical obstacle. In the case of an orifice, however, the vortices generated on either side have spin in the opposite sense to those generated on the corresponding side of an obstacle, that is to say the spin is outwards instead of inwards looking downstream.

In a similar manner also to the formation of vortex "streets" behind an obstacle such "streets" are formed at the sides of the issuing blade-like stream and the vortices proceed downstream on slightly divergent paths until they are dissipated by general turbulence. The distance apart of vortices on the same side tends to bear a constant relation to the breadth of the orifice and the vortices have a substantially constant slip velocity whilst they are staggered in opposite "streets" just as in the case of an obstacle.

The frequency $f$ with which such vortices are generated behind one side of the orifice is given by the formula $f=\sigma(v/b)$ where the "Strouhal constant" $\sigma$ is now in this case approximately equal to 0.055, $b$ is now the breadth of the orifice or slit and $v$ is the velocity of the fluid through it. As with an obstacle, the "Strouhal constant" $\sigma$ is in this case also independent of the density, viscosity, and temperature of the fluid provided that the velocity $v$ lies between certain limits.

Figure 19:
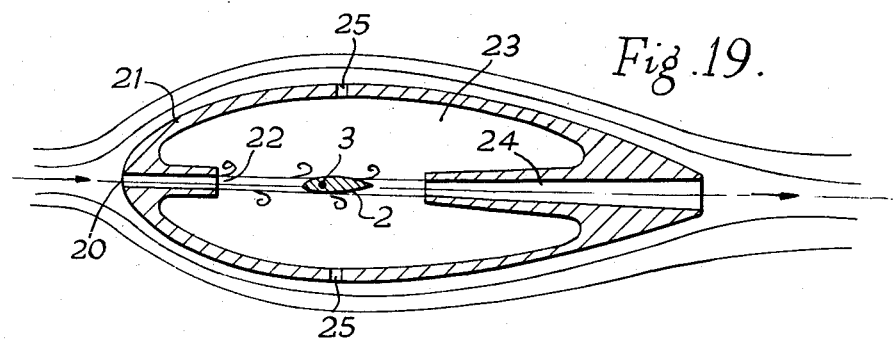
FIGURES 19 and 20 show by way of example alternative arrangements of an orifice and an associated vane-like element.
Figure 20:
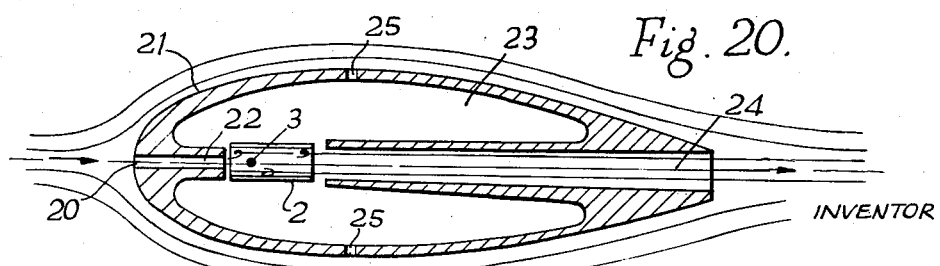

In general, however, the cylindrical vortices formed in this way are neither so strong nor so stable as in the case of those formed behind a cylindrical obstacle, but nevertheless the phenomenon has many applications and is, for example, utilized in the design of many musical wind-instruments such as organ pipes by arranging suitable thin wedges and pipes near the orifice so as to emphasize desired frequencies by acoustic resonance. FIGURES 19 and 20, which are cross-sections in plan, show by way of example how the phenomenon may also be used in conjunction with an oscillating vane-like element to measure and integrate fluid velocity in accordance with the present invention.

In FIGURE 19 a narrow parallel-sided channel 20 is formed in the nose of a casing 21, which casing is preferably in the form of a streamlined strut and is immersed in the stream of fluid the velocity of which it is desired to measure. If the direction of flow of the fluid may change the casing 21 may be rotatably mounted in bearings and a suitable weathercock vane or its equivalent may be provided to ensure that the axis of symmetry of the casing 21 lies substantially along the direction of flow of the fluid at all times.

Under these circumstances fluid will flow down the narrow channel 20 in a blade-shaped sheet and at a speed which tends at all times to be substantially proportional to that of the main body of fluid outside the casing 21, and when this blade-shaped sheet issues from the orifice 22 into the interior 23 of the casing 21 vortices are formed in "streets" in the manner hereinbefore described and at a frequency which is substantially proportional to the velocity of the main body of fluid.

The passage of the vortices may be detected by means of a vane 2 which is capable of oscillation about a longitudinal axis 3 at right angles to the direction of flow of the fluid and which is in the median plane of the whole system as in the case of the arrangement depicted in FIGURE 9. As with this latter arrangement the length of the vane 2 should preferably be approximately equal to the distance between consecutive vortices in the same "street" and it is also preferred that the upstream end of the vane should be at approximately this same distance or more behind the plane of the orifice 22 in order to avoid unwanted resonance effects. After passing the vane 2 the blade-shaped sheet of fluid ultimately rejoins the surrounding fluid through the outlet channel 24.

In the alternative and preferred arrangement depicted in FIGURE 20 the plane vane 2 of FIGURE 19 may be replaced by a tubular vane of similar form to that depicted by the vane 2 in FIGURES 15 and 16, the sides parallel to the orifice 22 being inclined inwards at an angle substantially equal to the natural angle of divergence of the blade-shaped jet when it emerges from the orifice 22 into the interior 23 of the casing 21. The distance between the upstream edges of these sides should preferably be somewhat greater than the width of the orifice 22, and the said upstream ends should also be located as near as possible to the orifice 22 consistent with the permitting of oscillation of the vane 2 about the longitudinal axis 3 with adequate mechanical clearance.

With this arrangement it is apparent that the vortex "streets" tend to be parallel to the operative sides of the tubular vane 2 so that the said vane is nowhere in substantial contact with the main diverging sheet of fluid and is accordingly only subject to the rocking action engendered by the vortices, which rocking action can be shown to be considerably greater than in the case of the previous arrangement depicted in FIGURE 19 since the rotation is in the opposite sense relative to the operative sides of the vane.

As with the previous arrangement the length of the tubular vane 2 should preferably be approximately equal to the distance between consecutive vortices in the same "street" and, after the blade-shaped sheet of fluid has issued from the orifice 20 and passed through the tubular vane 2 it then passes through an outlet channel 24 into the surrounding fluid in a similar manner also to that of the previous arrangement.

In both the arrangements depicted in FIGURES 19 and 20 the pressure of all stagnant fluid inside the casings should as far as possible be maintained the same as the ambient pressure of the fluid outside, to facilitate which suitable "static holes" or vents 25 may be provided in the sides of the casings 21 at or near their line of greatest breadth at right angles to the direction of flow of the fluid.

In the various arrangements of the invention depicted in FIGURES 9 to 16 and FIGURES 18 to 20 wherein the oscillating vane is not only subjected to the action of the vortices created by an obstacle or by an orifice but is also immersed in a part of the main stream of flow of the fluid, it is preferred that the longitudinal axis 3 about which the said vane oscillates be located at or just in front of the centre of pressure of the vane in the aero-dynamic or hydro-dynamic sense. Such a location of the longitudinal axis 3 is preferred in order that transient deviations in the general direction of the main flow of the fluid due to turbulence should not create any substantial turning moments or couples on the vane 2, apart from that created by the vortices, and thus by displacing the vane 2 tend to produce an error in the indicated frequency of oscillation.

In the case of a plane vane 2 such as depicted in FIGURE 9 its centre of pressure may be considered to be, for small displacements, at approximately a distance from the upstream edge of ⅕ of the length of the vane in a direction parallel to the general direction of flow of the stream, and with such a plane vane the preferred position of the longitudinal axis 3 is accordingly at or just in front of a point ⅕ of the length of the vane from its upstream edge in a direction parallel to the general direction of flow of the fluid. In the case of a thin streamlined vane such as depicted in FIGURE 10, the corresponding position of the centre of pressure is at a point approximately one quarter of its length from the upstream edge, whilst in the case of the vanes depicted in FIGURES 11, 12, 15, 16 and 20, the centre of pressure of the vane 2 is still further back from the upstream edge or edges relative to its length and this fact is advantageous as regards the balancing of the vane and the reduction of its moment of inertia about the longitudinal axis 3.

In the various arrangements of the obstacle or orifice and vane depicted in FIGURES 3 and 4, 7 to 16, 18, 19 and 20, it is also preferred that the oscillating vane-like element 2, together with any other attachments to the spindle or the like constituting the longitudinal axis 3 thereof (hereafter called the complete element) should be mechanically balanced in order that the said complete element should not be forced into spurious oscillation by any vibration of the body upon which it is mounted, and in order moreover that the complete element may not be forced into such spurious oscillation by unwanted angular accelerations of the body about any axis near to the complete element, it is preferred that the said complete element should be mechanically balanced in both the static and the dynamic senses. This latter condition of dynamic balance is most simply effected by constructing the said complete element so that it is statically balanced in every plane at right angles to its longitudinal axis 3, which balance is preferably effected by constructing the complete element so that it has mirror-symmetry about the said longitudinal axis 3. Such a construction is usually practicable in cases where the longitudinal axis 3 of the vane 2 is on the centre line of the said vane in a direction at right angles to the flow of the fluid such as in the arrangements depicted in FIGURES 7 and 8.

In cases, on the other hand, where the longitudinal axis of the vane is not on the said centre line, such as in the arrangements depicted in FIGURES 3 and 4, and in FIGURES 9 to 16, dynamic balance may still be attained by constructing the complete element in a symmetrical form about the median plane at right angles to the axis of the obstacle and to the plane of the vane which divides the fluid flow into two equal and opposite zones. Typical arrangements in accordance with these two means of attaining dynamic balance are shown in the FIGURES 21 and 23, and FIGURE 24, respectively.

Immunity from spurious oscillation is obviously of particular importance when the body is a moving one like a ship or an aircraft, and to ensure substantial immunity without making the mass and moment of inertia of the complete element about its longitudinal axis undesirably great it is usually convenient to incorporate in whole or in part the masses which balance the vibrating vane per se with the moving part of the transducer which is used to detect the vibration of the vane.

In all the arrangements of the invention hereinbefore described it is also preferred that there should be provided sufficient resilient control on the complete element to ensure that the said element is dynamically stable and that the average position of the vane thereof is maintained parallel to the initial direction of flow of the fluid relative to the body despite the action of non-periodic and random moments or couples on the vane which may arise from temporary and random variations in the general direction of flow of the fluid past the said vane due to turbulence or like causes. Such resilient control may be provided in a variety of well-known ways, and may be for example exercised either by suitably placed metal springs or by suitably placed strips, collars or grommets of a rubber-like material.

Alternatively, and particularly in cases where the frequencies of oscillation of the complete element, corresponding to the range over which it is desired to measure relative velocities between the body and the fluid, are all high it may be preferred to exert elastic control by means of the torsion of one or more thin rods, tubes or ligaments forming a coaxial extension of the longitudinal axis of the complete element and fixed at the outer end or ends to a suitable point or points on the body. As a further alternative sufficient elastic control may under some circumstances be exerted by pairs of taut fibers or ligaments arranged in parallel to one another in a manner similar to that used in the well known "bi-filar" suspension.

In some cases sufficient restraint or control of the complete element may be effected by electro-magnetic means preferably in conjunction with resilient control provided by other means such as described in the preceding paragraphs, and conveniently also the means of restraint or of resilient control may be incorporated in the transducer or device whereby the vibrations of the complete element are detected.

Whatever means of restraint or control be provided it is preferred that such means do not cause the complete element to have a natural period of oscillation, when immersed in whole or in part in the fluid with the obstacle removed and therefore with no vortices acting upon the vane which is greater than the lowest frequency at which the vane is designed to operate when subjected to the action of the vortices generated by the obstacle. As has been shown hereinbefore, this lowest frequency will normally correspond, in the case of a cylindrical obstacle of circular cross-section, to a velocity of the fluid at which the "Reynolds number" for the obstacle is approximately 500, and similar considerations apply with obstacles of other shape of cross-section. For convenience of measurement it is also preferred that the said lowest frequency should not be less than approximately 10 c./s. so that the whole range of frequencies corresponding to the range of "Reynolds numbers" between which the various arrangements hereinbefore described may be used for measuring fluid velocity should be, broadly speaking, within the so-called "audio range" of frequencies.

Provided that the natural frequency of the complete element per se under its resilient control is of the order of one-half of the above-mentioned lowest frequency, it can be shown that transient disturbances of the motion of the complete element produce minimum error in the measurement of the frequency of vibration caused by the passage of the vortices, whilst the complete element cannot resonate in vibration undesirably at any frequency within the range of measurement of the device or at any higher harmonics of this frequency. Furthermore, on account of the fact that the alternating moments or torques due to the action of vortices on the vane-like element tend to be proportional to the square of the velocity of the fluid, whilst the mechanical reactance to the vibration of the complete element about its longitudinal axis, due to its moment of inertia about the said axis, is proportional to the square of the frequency of vibration, it can be shown that with such a suitable choice of control the amplitude of vibration of the complete element due to the passage of the vortices tends to remain constant at all velocities of the fluid. Such a feature is clearly a desirable one when considering the design of the transducer whereby the frequency of vibration of the complete element is measured. The means for measuring and/or integrating the frequency of oscillation of the complete element and for translating it into a reading on an instrument calibrated to indicate the relative velocity between the fluid and the body and/or the total flow of the fluid past the body in a specified time, may comprise any known method for measuring the frequency of a mechanical vibration, such as a plurality of calibrated and tuned reeds, and any known method for integrating the frequency of a mechanical vibration such as the use of a mechanical counter or register, but will conveniently comprise electrical means for detecting the mechanical oscillation of the element and generating from such oscillation an alternating electrical voltage or current of the same frequency, which frequency can then be measured and/or integrated by any known method.

The means for detecting the mechanical vibration and for generating from such oscillation an alternating electrical voltage or current of the same frequency may comprise any suitable type of electrical transducer such as is used, for example, in gramophones or in devices for measuring the vibrations of machinery or of structures such as aircraft. Thus the said transducer may be, for example, of either the well known moving coil, induction, or moving-iron type, depending on the particular application of the invention, or on the other hand one of the well-known resistance types as, for example, the carbon microphone or the resistance strain-gauge.

Alternatively, the transducer may be of the capacitance type acting on a similar principle to the so-called condenser-microphone, or may utilise either the magneto-striction effect or the piezo-electric effect. In the latter case this effect may be utilised in a transducer similar to the well known crystal microphone or, alternatively, the vane-like element may itself be made of a piezo-electric material which is strained cyclically by the passage of the vortices along its operative faces, which cyclic strains in turn generate alternating electric voltages at the same frequency as the frequency of the vortices.

As a further alternative, in cases where it is essential that the transducer should exert negligible restraint on the movement of the complete element an optical system may be used, comprising a small mirror rigidly attached to the longitudinal axis of the complete element and vibrating therewith under the action of the vortices. A beam of light, suitably focused on to the mirror, is thereby caused to swing cyclically from one side to the other and to impinge alternately upon one or the other of two light-sensitive devices such as photo-electric cells, photo-transistors, or the like. The changes of electrical current or electrical voltage produced in the light-sensitive elements may then be caused to create in known fashion pulses of current or voltage at a frequency equal to that of the vortices or to a multiple thereof.

In most cases, however, it is preferred that the transducer shall be responsive primarily to rate-of-change of displacement rather than to displacement per se of the oscillating element, so that the ultimate readings are not substantially affected by non-periodic and random displacements of the element from its normal position of equilibrium.

Figure 21:
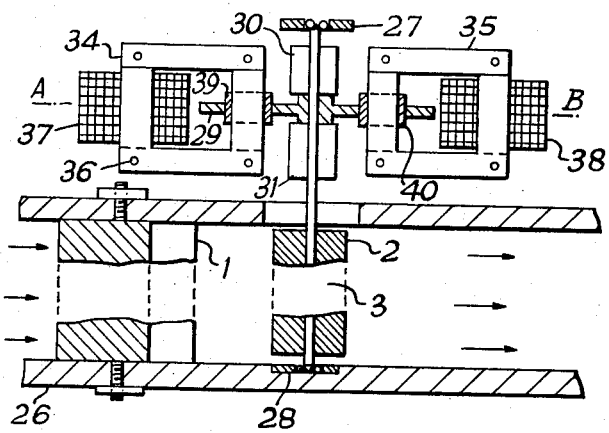
FIGURES 21 to 23 show by way of example one arrangement of an obstacle and an associated vane-like element together with an electrical transducer or means of detecting the oscillation of the vane-like element.
Figure 22:
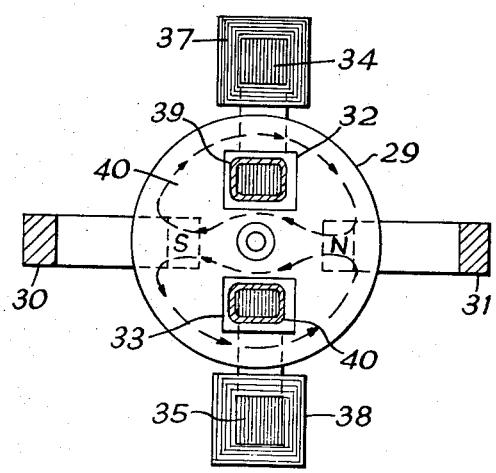
Figure 23:
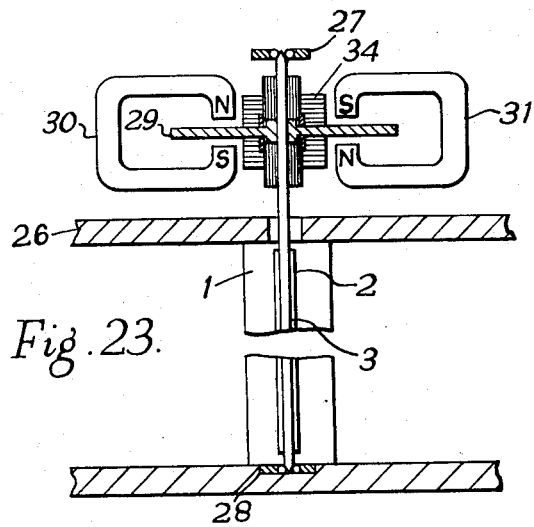

By way of example FIGURES 21, 22 and 23 depict diagrammatically a complete element and a type of transducer which may be advantageously used in a number of cases, particularly when an arrangement of obstacle and vane-like element such as depicted in FIGURES 7 or 8 is employed in, for example, an anemometer, an air-speed indicator, or a ship's log.

In this arrangement FIGURE 21 represents a longitudinal section of a channel or conduit 26 in which fluid is flowing past an obstacle 1 so as to generate vortices in the manner hereinbefore described and to cause a vane-like element 2 to vibrate. The said element is mounted symmetrically about a spindle 3 which in turn can oscillate in bearings 27 and 28, the said bearings being of any appropriate type such as miniature ball-bearings or jewelled ring-stones.

A disc 29 of a light material of good electrical conductivity such as aluminium is rigidly attached to the spindle 3 and oscillates therewith, this disc being shown in plan in FIGURE 22. The latter figure represents a section along the line AB depicted in FIGURE 21 at right angles to the longitudinal axis 3, whilst FIGURE 23 represents a section of the arrangement through the longitudinal axis 3 at right angles to the section of the arrangement depicted in FIGURE 21. From this FIGURE 23 it will be seen that the disc 29 oscillates between the poles of two permanent magnets 30 and 31 having opposite polarity as indicated, and such oscillation of the complete element generates eddy currents in the disc 29 which for a given sense of rotation of this disc tend to flow somewhat as depicted by the arrowed lines in FIGURE 22, that is to say diametrically across the disc 29 from points under one pair of magnet poles to points under the other pair of magnet poles, thence returning peripherally round the outside of the disc as shown. If the sense of rotation of the disc 29 is reversed so also is the sense of the currents, whence it is apparent that oscillation or vibration of the disc 29 generates alternating eddy currents therein.

It is arranged that the paths of the above-mentioned eddy currents link with two fixed and similar magnetic circuits, around which magnetic circuits are in turn wound coils, so that alternating voltages at the frequency of oscillation of the complete element are in turn developed therein. The said magnetic circuits may be constructed in a variety of ways but preferably the magnetic reluctance of each is made as small as possible, and its linkage with the eddy currents in the disc 29 as great as possible, by punching symmetrically-opposite holes 32 and 33 in the disc, as depicted in FIGURE 22, so as to permit of the passage alternately through these holes from one side of the disc 29 to the other of U-shaped laminations of magnetic material which laminations are, together with corresponding I-shaped laminations built up in known fashion to form two magnetic cores 34 and 35, as depicted in FIGURE 21, the cores being held together in conventional manner such as by studs and nuts passing through holes in the laminations 36.

The magnetic cores 34 and 35 have wound upon them coils 37 and 38 respectively whilst the dimensions of these cores 34 and 35 in relation to the holes 32 and 33 respectively, is such as to permit of adequate vibration of the disc 29 under the action of the vortices, but at the same time excessive vibration is prevented by contact with the sleeves 39 and 40 of rubber-like material, which sleeves may also be thickened to exert resilient control on the complete element if desired.

It is apparent that electrical voltages are only generated in the coils 37 and 38 when the disc 29 is actually moving so that the transducer is responsive only to rate of change of the position of the complete element and not to the position per se of the said element. This feature is, as already stated, a desirable one, whilst a further advantageous feature is that the complete element is dynamically balanced in every plane perpendicular to the longitudinal axis 3 and is therefore not likely to be forced into spurious oscillation by any vibration of the body upon which it is mounted.

Figure 24:
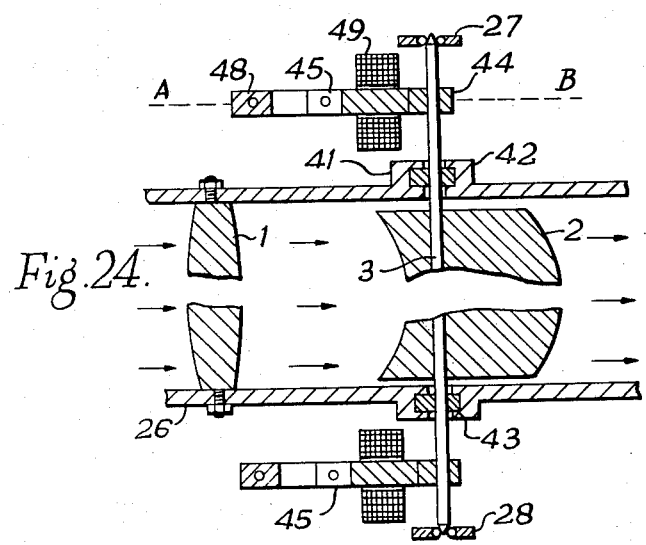
FIGURES 24 and 25 show by way of example another arrangement of an obstacle, associated vane-like element, and electrical transducer.
Figure 25:
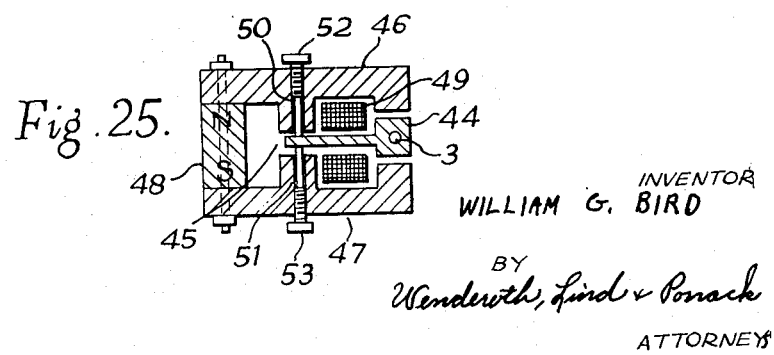

By way of further example FIGURES 24 and 25 depict diagrammatically a complete element and a type of transducer which may be advantageously used in cases when the obstacle and vane-like element are of the types depicted in FIGURES 9 to 16 and FIGURES 18 to 20, that is to say when the vane 2 per se may be unbalanced about its longitudinal axis 3.

In this arrangement FIGURE 24 represents a longitudinal section of, for example, a small circular pipe 26 in which fluid is flowing past the obstacle 1 so as to generate vortices in the manner hereinbefore described and to cause the vane-like element 2 to vibrate about its longitudinal axis 3 in suitable bearings 27 and 28. If it be desired that the transducer be isolated from the fluid flowing in the pipe 6 the said pipe may comprise two segments with flanges 41 and 42 which are bolted together in known fashion so as to compress a ring-gasket 43 of rubber-like material, whilst to permit of the passage of the longitudinal axis or spindle 3 through such a ring-gasket 43 the said gasket may have appropriate holes punched through it as nearly as possible diametrically opposite one to another and be then divided by a circumferential cut into two equal halves. Assembly of the gasket around the complete element is thus permitted.

In the present arrangement the complete element is provided with two identical transducers, one at each end as depicted in FIGURE 24, and each transducer acts on a somewhat similar principle to the well known "moving-iron" pick-up used with gramophones. Such a transducer is represented diagrammatically in FIGURE 25, which is a section in plan through the line AB in FIGURE 24 at right angles to the longitudinal axis or spindle 3. Each transducer comprises an armature 44 of magnetic material which is rigidly attached to the shaft 3 and vibrates therewith. A part of this armature 44 comprises a tongue 45 extending radially outwards as shown, and the whole member in its normal position of equilibrium rests symmetrically between the limbs of two fixed and oppositely-facing F-shaped yokes 46 and 47 of magnetic material and of identical construction so that two pairs of equal air gaps are created, one pair at each end of the armature 44. Preferably, although not necessarily, all four air gaps have in this normal position of equilibrium equal magnetic reluctances.

A magnetic potential from a permanent magnet 48 is applied to the two yokes 46 and 47 in series, thereby causing magnetic fluxes to stream in parallel across the two pairs of air gaps and forming in effect a magnetic analogy of the well known "Wheatstone bridge." Thus as a result of the equality of the air gaps and consequent equality of their magnetic reluctances when the armature 44 is in its normal position of equilibrium, no magnetic flux flows in either direction along the tongue 45 when in this position of equilibrium. When however, the said armature 44 oscillates with the complete element, the balance of the magnetic "Wheatstone bridge" is upset first in one direction and then in the other, and an alternating magnetic flux is accordingly caused to flow in the tongue 45 at the same frequency as that of the mechanical oscillation. This alternating magnetic flux in turn generates an alternating electrical voltage in a fixed coil 49 surrounding the tongue 45.

It can be shown that in the absence of any other resilient control on the complete element, the armature 44 is unstable insofar as the tongue 45 tends to adhere to one pole piece or the other and not to remain in the position of equilibrium. It can be further shown, however, that the displacing force from the position of equilibrium due to the magnetism tends to be proportional to the said displacement and thus to produce in effect a "negative stiffness" of the complete element. As such, compensation at all frequencies may be effected by providing elsewhere a greater amount of positive or true stiffness or resilience of the complete element by known means such as rubber strips or the like. Preferably, as already indicated, the resultant or net positive stiffness should be such as to make the natural period of oscillation of the complete element per se about one-half of the lowest frequency it is desired to measure.

In the particular arrangement depicted in FIGURE 24 a certain amount of positive stiffness or resilience is in fact provided by the gasket 43, and further positive stiffness or resilience may then, as required, be provided by plugs 50 and 51 of rubber-like material which are inserted in holes drilled in the pole pieces corresponding to the extremity of the tongue 45 and which plugs may be compressed equally into any desired degree of contact with the tongue 45 by means of the adjusting screws 52 and 53.

As with the previous arrangement electrical voltages are only generated in the coil 49 when the complete element is actually moving so that the transducer is responsive only to rate of change of the position of the complete element and not to the position per se of the said element.

This feature is, as already stated, a desirable one whilst it is also apparent that by suitable choice of the dimensions of the two armatures 44 the complete element may be statically balanced despite the eccentricity of the vane 2 in relation to the longitudinal axis 3. Furthermore, the complete element is dynamically balanced by virtue of its symmetrical construction relative to a plane through the centre of the tube 26 at right angles to the longitudinal axis 3.

As already indicated, the invention may have a large number of applications, for example, as an anemometer, as a true air-speed and air mileage indicator, as a ship log, and as a means for measuring and integrating the flow of different fluids through a pipe, channel or conduit. In many such applications involving the measurement and integration of the flow of a fluid through a pipe or the like it is desirable that the means of measurement should not cause any substantial obstruction in the pipe or loss of head therein, and in the case of a large pipe a very convenient arrangement of the present invention which satisfies these conditions is depicted in FIGURES 26 and 27.

Figure 26:
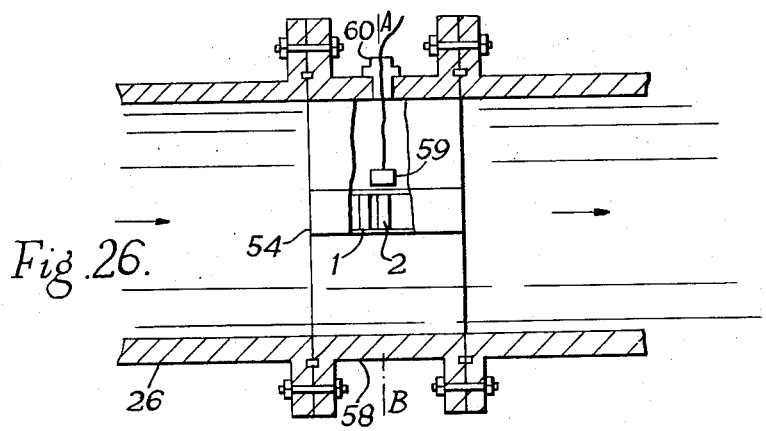
FIGURES 26 and 27 show by way of example one arrangement of the invention for measuring fluid velocities in a large pipe.
Figure 27:
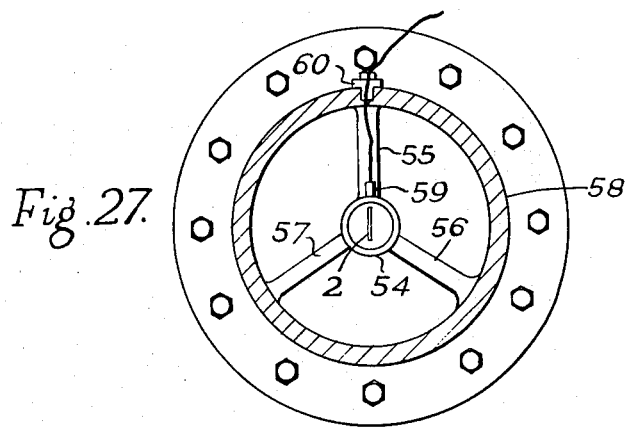

FIGURE 26 represents a longitudinal section of a main pipe 26 and FIGURE 27 a cross-section thereof along the line AB denoted in FIGURE 26. The obstacle 1 and complete element 2 may now be located in a small auxiliary pipe 54 which in turn is preferably although not necessarily located along the central axis of the main pipe 26. The auxiliary pipe 54 is maintained in place by hollow streamlined struts 55, 56 and 57 which are suitably attached to an outer casing 58 and this casing is flanged so that it may be inserted in a section of the main pipe 26 as shown. A cut-away portion in FIGURE 26 indicates diagrammatically the position of the obstacle 1 and vane 2 whilst the position of the transducer 59 is also indicated schematically therein. The necessary electrical cables from this transducer 59 may be then arranged to pass to the outside through one of the hollow streamlined struts 55 and through a pressure-tight gland 60 at one side of the casing 58.

With this arrangement it can be shown that the velocity of the fluid down the auxiliary pipe 54 always bears a substantially constant ratio to the average velocity of the fluid in the main pipe 26 provided that the hydro-dynamic or aero-dynamic resistance, as usually defined, to the flow of the fluid through the auxiliary pipe 54 is always strictly proportional to the density of the fluid and to the square of its velocity through the pipe. This condition is only approximately obeyed if the auxiliary pipe 54 is smooth inside, but is obeyed almost exactly if the interior of the said pipe is suitably roughened by cross-knurling or otherwise in a similar manner to that of the pipe 12 indicated in FIGURES 17 and 18. The frequency of the voltage or current generated by the transducer 59 is then, within specified limits, always proportional to the average velocity of the fluid through the main pipe 26 and an indicator of the said frequency may be calibrated accordingly.

It has been already noted that the phenomenon of vortex generation behind a cylindrical obstacle, at a frequency proportional to the velocity of the fluid relative to the obstacle, occurs only between a lower and an upper limit of velocity with an obstacle of given breadth $b$ and a fluid of given kinematic viscosity $v$. In many applications of the invention, it may be desired to measure the velocity $v$ of fluids at very slow speeds, which would in turn imply that the size of the obstacle would have to be inconveniently large since the "Reynolds number" R for the obstacle ($=vb/v$) has to be greater than a certain value (500 in the case of a cylindrical obstacle of circular cross-section). Since, moreover, the frequency $f$ of the generation of vortices is given by the formula $f=\sigma(v/b)$, as hereinbefore mentioned, the large size of the obstacle and small velocity implies ipso facto and un- desirably small value of the initial frequency corresponding to the lowest velocity it is desired to measure.

Figure 28:
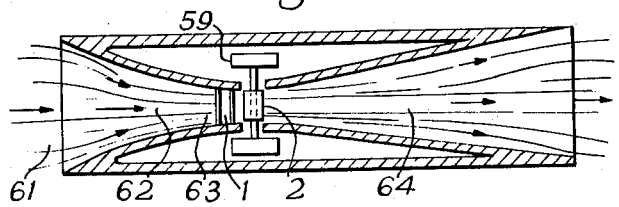
FIGURES 28 and 29 show by way of example means whereby the "Venturi" effect may be used to change the range of measurement of fluid velocities.

In such cases it is preferred that use be made of the well known principle of the "Venturi" tube as depicted in FIGURE 28. In this figure, which represents diagrammatically a longitudinal section of such a Venturi tube, fluid is approaching from the left and is constrained to pass through the "mouth" 61 of the Venturi tube down the coned entrance 62, through the "throat" 63, and thence through the coned exit 64. In the case of a liquid the density of which can be considered as constant, and in the case of a gas as long as compressibility effects can be ignored and its density again considered as constant, it is well known that the velocity of the fluid at the "throat" 63 is always proportional to its velocity at the "mouth" 61 and that the ratio of the two velocities is inversely as the ratio of the cross-sectional area of the "throat" 63 to that of the "mouth" 61. In consequence the velocity of a slow-moving fluid may in this way be "transformed" to a higher velocity which may be measured in accordance with the present invention by means of a suitable obstacle 1, vane-like element 2 and transducer 59 as shown schematically in the figure.

Such a Venturi tube may be inserted directly in a pipe or conduit or alternative may take the place of the auxiliary pipe 54 depicted in FIGURE 26. It is obvious of course that the transformation up of the lower limit of velocity in this way also involves ipso facto the transformation up of the upper limit and in consequence the deleterious effects of cavitation or compressibility may begin to occur at an earlier value of the velocity of the stream than would occur if this velocity were measured directly and without recourse to the Venturi effect. It can be shown nevertheless that, in most applications of the invention, the velocity of a stream of fluid can be measured over an adequate range right down to speeds at which existing methods of fluid-flow measurement become inefficient.

Figure 29:
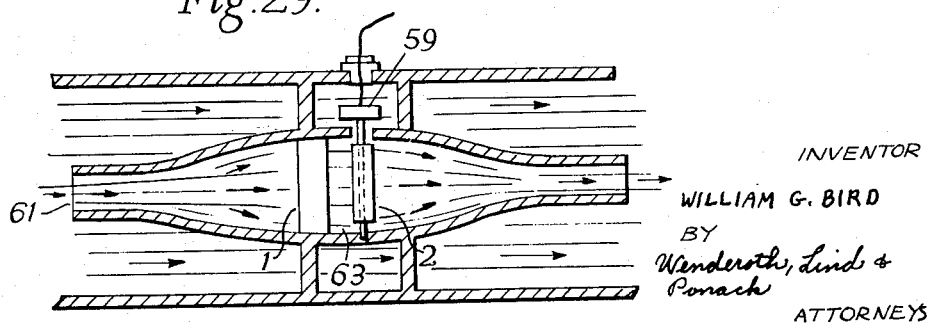

In other applications of the invention on the other hand, and notably in true air-speed and air-distance indicators where it may be desired to measure air-speeds over a range of values of the so-caled "Mach" number between, say, 0.1 and 1.5 it is desirable to transform down in effect the maximum velocity to a value considerably less than the velocity of sound in the fluid so that compressibility effects may then be considered as negligible, and this may be effected by utilising a Venturi tube of "inverted" type such as depicted in longitudinal section by FIGURE 29. In this case the velocity of the fluid at the "throat" 63, which is measured in the usual way by an appropriate combination of obstacle 1, vane-like element 2, and transducer 59, is less than the velocity at the "mouth" 61 in a substantially constant ratio, which ratio is as before inversely as the cross-sectional area of the "throat" 63 to that of the "mouth" 61.

A similar artifice may be used in the case of liquids when it is desired to delay the onset of deleterious cavitational effects behind the obstacle 1 so as to permit of the measurement of higher velocities. From Bernouilli's theorem on fluid-flow it is apparent that, whilst the velocity of a liquid at the "throat" 63 of such an "inverted" Venturi tube as depicted in FIGURE 29 is now less than the velocity at the "mouth" 61, the ambient pressure at the "throat" 63 is ipso facto greater than at the "mouth" 61. For both reasons cavitation will not occur behind the obstacle 1 at a fluid velocity of the main stream which would normally produce cavitation if the obstacle 1 were exposed directly to this main stream, and higher velocities of the latter stream may accordingly be measured before deleterious cavitation effects behind the obstacle 1 do actually occur. It can in fact be shown that, by suitable choice of the ratios of the cross-sectional areas of the "throat" 63 and "mouth" 61, depending upon the shape of the obstacle 1, the onset of cavitation may be virtually delayed in this way indefinitely and liquid velocities successfully measured up to a point at which compressibility effects become significant, or the velocities approach the velocity of sound in the liquid. For example, in the case of a cylindrical obstacle of circular cross-section the cross-sectional area of the "throat" 63 should be approximately 40% greater than that of the "mouth" 61.

Figure 30:
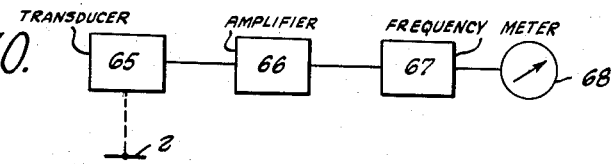
FIGURE 30 is a schematic representation of means for measuring the frequency of oscillation of a vane.

The frequency of the alternating electrical voltage or current generated in an electrical transducer of any of the types hereinbefore described may be measured by any known means whereby the corresponding velocity of the fluid past the obstacle, or a derivative thereof, may be indicated or recorded on a suitable meter. For example as shown in FIGURE 30 the electrical output of a transducer 65, which is mechanically coupled with the oscillatory vane 2, is amplified by an amplifier 66 and applied to a frequency meter 67, which is of known type, and in which the frequency of an applied alternating current signal is indicated on a pointer type instrument 68. Likewise the total number of cycles of the alternating electrical voltage or current in a given time may be counted by any known means whereby the corresponding total flow of fluid past the obstacle in the same time may be similarly indicated on an appropriate meter. Thus, for example, the alternating electrical voltage or current may be amplified if necessary by known means and measured directly on an electrical frequency meter of known form such as, for example, that described in British Patents Nos. 387,403 and 422,202, the said frequency meter being suitably calibrated in terms of velocity. The frequency may be also integrated, if desired, so as to give the measure of the total fluid-flow in a specified time by applying the alternating electrical voltage or current output from the transducer, amplified if necessary to a self-starting synchronous A.C. electrical motor the revolutions of which in the specified time may be counted by any known form of mechanical counter coupled to the motor and calibrated in terms of total fluid flow or, in the case of logs or distance indicators, the distance traversed through the fluid.

It is preferred, however, that the frequency of the alternating electrical voltage or current generated by an electrical transducer be measured by conversion of the said alternating electrical voltage or current, after amplification if necessary, into discrete electrical pulses the frequency of which may be measured by any of the known methods employed in, for example, research work on nuclear physics or in computing devices. Thus in one form of circuit the amplified pulses may be used to saturate, first in one direction and then in the other, the core of a magnetic reactor, and the change in magnetic flux in the said core from a constant value of one algebraic sign to a constant value of the opposite algebraic sign may be used to generate pulses in a linked coil. These latter pulses after rectification then produce a mean unidirectional current proportional to the frequency of the originating pulses, which current may be applied to a suitably calibrated D.C. meter.

Alternatively the said discrete electrical pulses may be applied in known circuits involving electronic valves, hot-cathode discharge tubes, cold-cathode discharge tubes, transistors, or the like, in which the application of a pulse permits of the charging of a capacitor to a certain stabilised voltage and its subsequent complete discharge, so that the mean discharge current from the capacitor is again proportional to the frequency of the originating pulses and may be applied to a suitably-calibrated D.C. meter.

Such a D.C. current proportional to the frequency of the originating pulses and therefore to the velocity of the fluid may, if desired, be amplified by known means such as by the use of magnetic amplifiers and thereafter integrated in order to measure the total flow of the fluid past the obstacle, since the total quantity of electricity flowing in a given time is clearly proportional to the total flow of fluid in the same time. Such integration may be effected by known means such as the use of an electrolytic meter acting on a similar principle to the meters of this type used in D.C. supply systems.

In a preferred method of integration the D.C. current, amplified if necessary, is applied to the field coils of a so-called "integrating D.C. motor" in which the armature is energised by a constant current. The torque generated in such a motor is thus proportional to the D.C. current in the field coils, which in turn is proportional to the frequency of the originating pulses, and this torque is applied to a magnetic tachometer of known type in which a rotating permanent magnet drags round against the action of a spring, and by virtue of eddy current action, a cup-shaped rotor of aluminium, copper or similar material of high electrical conductivity.

It can be shown that the torque necessary to drive such a tachometer is proportional to the speed of rotation of the permanent magnet, so that if the tachometer is mechanically coupled to the integrating D.C. motor the speed of the armature of the said motor, and of the permanent magnet in the tachometer, will be substantially proportional to the D.C. current in the field coils, and therefore to the originating electrical pulses, if suitable steps be taken to eliminate all extraneous source of static friction acting on the rotating parts. The magnetic tachometer may thus be suitably calibrated to indicate the velocity of flow of the fluid whilst a suitable mechanical counter, in the operation of which static friction is also virtually eliminated and which is mechanically coupled to the integrating D.C. motor, may be used to indicate total flow of the fluid.

If preferred, so-called triggered electronic counting circuits may be used to effect integration. These may, for example, comprise a plurality of so-called "scale-of-two" counters of the well-known bi-stable type connected together in cascade, or a plurality of so-called "scale-of-ten" counters connected together in cascade, or any suitable combination of such counters arranged so as to actuate ultimately a mechanical counter or register suitably calibrated in terms of total fluid flow. Alternatively, or in addition, a plurality of so-called "transfer tubes" such for example as are known by the British registered trademark "Dekatron" may with their associated circuits be employed in cascade, and in such a case a mechanical counter or register may be omitted and the indications of total fluid flow caused to appear on the "transfer tubes" themselves in the form of moving spots of light against appropriately calibrated circular dials.

I claim:

1. A device for measuring the velocity of a fluid comprising a vane-like element mounted for oscillatory movement about an axis extending at right angles to the direction of flow of said fluid, and with its plane of symmetry extending substantially parallel to said direction of flow, means positioned upstream of said vane-like element for generating a double stream of travelling vortices in said fluid, and means for measuring the frequency of oscillation of said element.

2. A device as claimed in claim 1, said vortex-producing means comprising a rod-like element having a principal axis extending parallel to the axis of oscillation of said vane-like element.

3. A device as claimed in claim 1, said vortex-producing means comprising an obstruction having a slot therein, the said slot extending parallel with the axis of oscillation of said vane-like element.

4. A device as claimed in claim 1, said vane-like element comprising a flat plate-like member of rectangular section.

5. A device as claimed in claim 1, said vane-like element comprising a plate-like member of streamline section.

6. A device as claimed in claim 1, said vane-like element comprising a plate of double wedge shape in cross section and arranged with the point of the wedge extending upstream.

7. A device as claimed in claim 1, said vane-like element comprising two flat plate-like members secured together in spaced relation.

8. A device as claimed in claim 1, said vane-like element comprising two flat plate-like members secured together in spaced relation with the upstream edges thereof more closely spaced than the downstream edges.

9. A device for measuring the velocity of a fluid comprising means for producing a double stream of travelling vortices in said fluid, a vane-like element arranged in said fluid adjacent said vortices and downstream of said vortex-producing means, said element being mounted for oscillatory movement about an axis extending at right angles to the direction of flow of said fluid and having its plane of symmetry extending in the said direction of flow, and means for measuring the frequency of oscillation of said element.

10. A device for measuring the velocity of a fluid comprising a rod-like element mounted for oscillatory movement about its longitudinal axis and with said axis extending at right angles to the direction of flow of said fluid, a vane-like element rigidly connected with said rod-like element and positioned downstream thereof with its plane of symmetry parallel with said direction of flow, and means for measuring the frequency of oscillation of said element.

11. A device for measuring the velocity of a fluid comprising a rod-like element, the longitudinal axis of which extends at right angles to the direction of flow of the fluid, and a vane-like element flexibly connected with said rod-like element and positioned downstream thereof with its plane of symmetry parallel with the said direction of flow and with the said longitudinal axis of said rod-like element.

12. A device for measuring the relative velocity between a body and a contiguous fluid comprising a vane-like element mounted on said body for oscillatory movement about an axis extending at right angles to the direction of flow of said fluid, and with its general plane of symmetry extending parallel with said direction of flow, means mounted on said body upstream of said vane-like element for generating two rows of travelling vortices in said fluid, and means for measuring the frequency of oscillation of said element.

13. A device for measuring the velocity of a fluid comprising an elongated hollow casing arranged in said fluid with its major axis extending at right angles to the direction of flow of said fluid, said casing being formed with a slot in its upstream and downstream sides, and a vane-like element mounted in said casing for oscillatory movement about an axis extending parallel with the said major axis and with its plane of symmetry lying in a plane passing through the centre line of said slots.

14. A device as claimed in claim 13, said casing being of streamline shape in cross-section.

15. A device for measuring the velocity of a fluid flowing through a conduit comprising a hollow cylindrical member mounted coaxially in said conduit, a rod-like element extending diametrically across and within said cylindrical member, and a vane-like element in said cylindrical member mounted for oscillatory movement about an axis extending diametrically of said member and parallel with the axis of said rod-like element.

16. A device for measuring the velocity of flow of a fluid in a conduit comprising a rod-like element extending diametrically across said conduit and a vane-like element mounted downstream of said rod-like element for oscillatory movement about an axis extending diametrically of said conduit and spaced from said rod-like element.

17. A device as claimed in claim 16, said rod-like element being of circular cross-section and of smaller diameter at its ends than at its centre, and the upstream and downstream edges of said vane-like element being curved with the outer ends thereof upstream of the centre thereof.

18. A device for measuring the velocity of a fluid flowing through a conduit comprising a hollow cylindrical member mounted coaxially in said conduit, a rod-like element extending diametrically across and within said cylindrical member, and a vane-like element in said cylindrical member mounted for oscillatory movement about an axis extending diametrically of said member and parallel with the axis of said rod-like element, and means coupled to said vane-like element for measuring the frequency of oscillation of said vane-like element.

19. A device for measuring the velocity of flow of a fluid in a conduit comprising a rod-like element extending diametrically across said conduit and a vane-like element mounted downstream of said rod-like element for oscillatory movement about an axis extending diametrically of said conduit and spaced from said rod-like element, and means coupled to said vane-like element for measuring the frequency of oscillation of said vane-like element.

References Cited in the file of this patent

UNITED STATES PATENTS

| | | |
|---|---|---|
| 790,888 | Ferris | May 30, 1905 |
| 1,193,488 | Thomas | Aug. 1, 1916 |
| 1,911,169 | Trogner | May 23, 1933 |
| 1,935,445 | Heinz | Nov. 14, 1933 |
| 2,492,371 | Sivian | Dec. 27, 1949 |
| 2,519,015 | Bensen | Aug. 15, 1950 |
| 2,813,424 | Liepman | Nov. 19, 1957 |
| 2,869,366 | Nitikman | Jan. 20, 1959 |

FOREIGN PATENTS

| | | |
|---|---|---|
| 65,537 | Austria | July 1914 |